Aug. 23, 1955 T. J. P. PEARCE 2,716,055
PRODUCTION OF WATER GAS AND THE LIKE
Filed Feb. 19, 1951
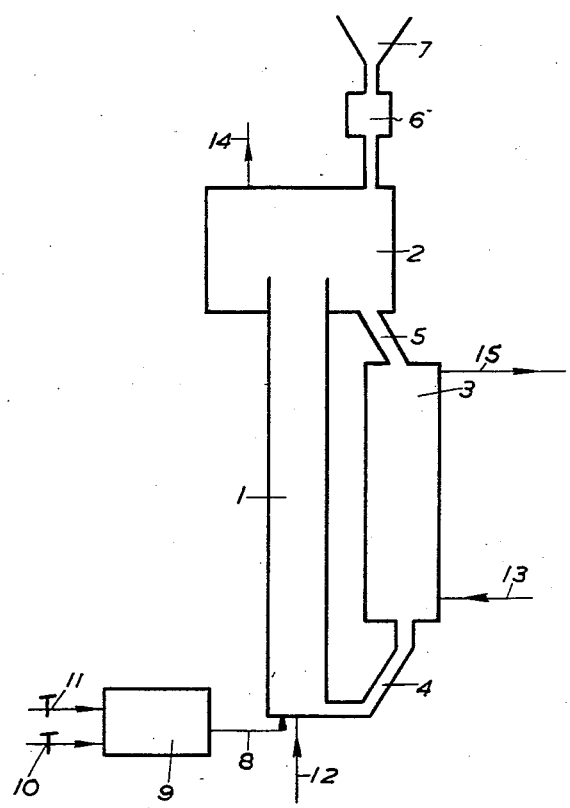
Inventor
Thomas James Perrett Pearce
By Cushman, Darby & Cushman
Attorneys

2,716,055
PRODUCTION OF WATER GAS AND THE LIKE

Thomas James Perrett Pearce, Norton-on-Tees, England, assignor to Imperial Chemical Industries Limited, a corporation of Great Britain Application February 19, 1951, Serial No. 211,591

Claims priority, application Great Britain March 21, 1950

3 Claims. (Cl. 48—206)

This invention relates to the production of carbon monoxide in admixture with other gases, more particularly of water gas, from particulate carbonaceous material by subjecting it successively in separate vessels to treatment with air or other oxidising gas, hereinafter termed the blow stage, and with steam or carbon dioxide, hereinafter termed the make stage. The terms blow and make stage are commonly employed in connection with the production of producer and water gas.

In the production of water gas and like gaseous mixtures containing carbon monoxide in a make and blow stage, considerable thermal inefficiency has been experienced due to the potential heat of carbon monoxide lost in blow gas. It was found that in the production of water gas the loss of carbon monoxide amounted to about 25% by volume of the total carbon oxides.

According to the present invention, therefore, a process of producing in separate make and blow stages from particulate carbonaceous material water gas or a similar gas mixture containing carbon monoxide comprises operating the blow stage at a gas velocity such that the particulate carbonaceous material is in the form of an entrained stream as hereinafter defined.

By this means the loss of potential heat in carbon monoxide can be greatly reduced, and the production of water gas or the like thereby made considerably more economical than it has been heretofore.

Preferably the process is carried out continuously.

The following explanation of the behaviour of a bed of discrete particles of solid material, through which a gas is passed with increasing velocity, is given for the purpose of defining the terms used in this specification and for the better understanding of the invention.

When a stream of gas is passed in an upward direction through a bed of discrete particles, the pressure drop through the bed at first increases with increase in velocity of the gas. In this region of gas velocities, the gas exerts an upward frictional force on the particles. The upward frictional force exerted on the particles is, at all points, proportional to the pressure drop through the bed of particles. Hence the force exerted by each particle on the subjacent particles is progressively reduced, and the frictional force exerted by the particles on each other is also progressively reduced. It will be understood that the maximum angle of repose of the bed of discrete particles is thereby also progressively reduced.

As the gas velocity is further increased, a first critical value is reached, at which the whole weight of the particles is borne by the gas by virtue of the increased frictional force exerted by the gas on the particles. It will be understood, therefore, that the maximum angle of repose of the particles is reduced, at this first critical value, to zero.

As the velocity of the gas increases above this first critical value, the particles in the bed re-arrange themselves to produce an increased voidage in the bed, while yet remaining in contact with one another. The increase in voidage has the effect of maintaining the frictional force of the gas on the particles constant and equal to the weight of the particles. The pressure drop across the bed also remains substantially constant for all gas velocities above the first critical value, but below the third critical value to be defined below. At this first point the bed of discrete particles assumes some of the properties of a liquid, for example the particles can be poured in a manner similar to liquids, and the bed can easily be stirred.

As the gas velocity is still further increased, a second critical value is reached where the voidage in the bed has increased to such a value that the particles are substantially cushioned by the fluid, and the bed assumes the appearance of a boiling liquid.

As the gas velocity is increased beyond the second critical value, the bed continues to expand until a third critical value is reached at which the gas velocity is substantially equal to the free falling speed of the particles in the gas being used, and immediately beyond this value the particles are carried along and out of the vessel as a stream entrained in the gas.

We define a bed of particles through which the fluid velocity is greater than the first critical value as being in the fluidised state. When the velocity through the bed is greater than the first critical value but less than the second critical value, we define the bed of particles as being in the expanded state. A bed of particles through which the fluid velocity is greater than the second critical value but less than the third critical value we define as being in the boiling state. Furthermore, the term "entrained stream" should be understood as referring to particles which are subjected to a gas velocity higher than the third critical value and which are carried along and out of the vessel.

Experiments were carried out using a combustion system in which the finely divided coke particles were in an entrained stream, the empty tube velocity (i. e. the gas velocity as measured in the absence of solid material) being about 23 feet per second and the temperature 1020° C., and it was found that the carbon monoxide in the products of combustion was 5.3% by volume, the ratio $$\frac{CO}{CO+CO_2}$$

being only 0.24. Further experiments were carried out, using the same coke material, with an empty tube velocity of 36 feet per second, and the carbon monoxide in the products of combustion was only 1.6% by volume at 1020° C., the ratio $$\frac{CO}{CO+CO_2}$$

being only 0.08.

In yet further experiments, the variation in carbon monoxide content of the combustion gases was measured when the lengths of the tubes in which combustion took place was varied and the diameters of the tubes adjusted so that the volume of the tubes was always the same. 20 kg./hr. of finely divided coke preheated to 900° C. were fed to a tube of 2″ diameter and 35″ length which was electrically heated to maintain a temperature of 900° C. 3 m.³/hour of air were fed to the base of the tube to entrain the hot coke. The carbon monoxide content of the combustion gases was found to be 1.65% by volume. The tube was then replaced by a second tube of 1½″ diameter and 62″ length, i. e., of roughly the same capacity as in the previous experiment, thus keeping the contact time the same as before but increasing the entraining velocity from 158 cms./second to 283 cm./second. The carbon monoxide content of the combustion gases was then found to be 0.45% by volume.

An example will now be given of a plant and its operation in which the invention was carried into practice, this plant being illustrated diagrammatically in the single figure of the accompanying drawing.

*Example*

The plant, constructed for the production of water gas from finely divided coke, consisted essentially of a combustion tube 1, 18" in diameter and 35' long, a disengaging vessel 2 of 10 m.³ capacity surmounting the combustion tube 1, and a water gas reactor 3 adjacent to the combustion tube 1. A six inch connection 4 was made between the base of the water gas reactor 3 and the base of the combustion tube 1, and a similar connection 5 was made between the base of the disengaging vessel 2 and the top of the water gas reactor 3 so that finely divided coke could be circulated between the combustion tube 1 and the water gas reactor 3, the heat required in the latter being provided by burning part of the finely divided coke in circulation in the combustion tube 1. Make-up coke was introduced from a coke feeder 6 with hopper 7; spent solid was removed from the system by way of a purge not shown. Steam was introduced into the water gas reactor 3 by way of inlet 13, water gas was taken off by outlet 15, and combustion gases left the system by outlet 14. The plant was heated up by passing hot combustion gases by way of inlet 8 from a combustion chamber 9 (into which air and fuel gas entered by way of regulating valves 10 and 11, respectively), and by circulating approximately 10 tons/hour of finely divided coke between combustion tube 1 and water gas reactor 3. When the plant had been heated up to the desired temperature, valves 10 and 11 were closed and 900 m.³/hour of air, preheated to 400° C. were fed through inlet 12 to the combustion tube 1, while approximately 20 tons/hour of finely divided coke were circulated between combustion tube 1 and water gas reactor 3. The temperature was maintained at 1000° to 1020° C. by small adjustments to the air feed rate. Under these conditions the finely subdivided coke in the combustion tube 1 was in the form of an entrained stream. The carbon monoxide content of the combustion gases leaving the system by outlet 14 was found to be approximately 10% by volume.

The combustion tube 1 was then rebuilt with a bore of 12" instead of 18", other parts of the plant remaining the same. When the plant was then run under the same conditions as before, it was found that the carbon monoxide content in the combustion gases leaving the system by outlet 14 was only about 3% by volume. In the first run described the empty tube velocity in the combustion tube 1 was 22 feet/second; in the second run this velocity was 49 feet/second. This increase in empty tube velocity had thus reduced the carbon monoxide content in the combustion gases from 10% to 3% by volume, increasing the combustion efficiency substantially.

It is, therefore, a feature of this invention to operate the blow stage in water gas or similar gas production of the type referred to at a gas velocity substantially above the minimum required to produce an entrained stream, preferably at least twice to three times the said minimum, so as to reduce the carbon monoxide content of the combustion gases as far as desired or economically feasible.

I claim:

1. In a process for the production of water gas which comprises charging particulate carbonaceous material to a water gas formation zone, passing steam upwardly through said water gas formation zone into contact with said carbonaceous material maintained at a temperature of 900–1050 C., said steam flowing at a rate sufficient to maintain the carbonaceous material in the form of a boiling bed, withdrawing carbonaceous material from said water gas formation zone and introducing it into a combustion zone, raising the temperature of the carbonaceous material in said combustion zone by combustion of part thereof with air whereby gaseous products of combustion are formed, maintaining the temperature of the carbonaceous material in said water gas formation zone by introducing therein the carbonaceous material of increased temperature produced in said combustion zone, and wherein the product water gas from the gas formation zone is recovered separately from the gaseous products from the combustion zone, the improvement which comprises passing said air upwardly through said combustion zone at a rate of at least twice the minimum required to produce an entrained stream, the solids-in-gas apparent density of the carbonaceous material in said combustion zone being only a fraction of a pound per cubic foot.

2. A process for the production of water gas comprising charging particulate carbonaceous material to a water gas formation zone, passing steam upwardly through said water gas formation zone into contact with said carbonaceous material, maintaining the carbonaceous material at a temperature of 900° to 1050° C., withdrawing carbonaceous material from said water gas formation zone and introducing it into a combustion zone, raising the temperature of carbonaceous material in said combustion zone by combustion of part thereof with a gaseous reactant consisting essentially of air, said air being passed upwardly through said combustion zone at a rate of at least twice the minimum required to produce an entrained stream, the solids-in-gas apparent density of the carbonaceous material in said combustion zone being only a fraction of a pound per cubic foot, the effluent gas from the combustion zone containing not over about 3% of carbon monoxide, and maintaining the temperature of the carbonaceous material in said water gas formation zone by introducing therein the carbonaceous material of increased temperature in said combustion zone.

3. The process of claim 2, wherein the air is passed upwardly through the combustion zone at a rate to give a solids-in-gas apparent density of the carbonaceous material in said combustion zone of about 0.33 pound per cubic foot.

References Cited in the file of this patent

UNITED STATES PATENTS

| | | |
|---|---|---|
| 2,305,569 | Degnen | Dec. 15, 1942 |
| 2,389,236 | Payne | Nov. 20, 1945 |
| 2,582,710 | Martin | Jan. 15, 1952 |
| 2,618,544 | Fischer et al. | Nov. 18, 1952 |
| 2,662,007 | Dickinson | Dec. 8, 1953 |

FOREIGN PATENTS

| | | |
|---|---|---|
| 632,466 | France | Oct. 10, 1927 |
| 626,743 | Great Britain | July 20, 1949 |